United States Patent
Zula et al.

(10) Patent No.: US 12,291,181 B2
(45) Date of Patent: May 6, 2025

(54) SYSTEMS AND METHOD FOR AUTOMATICALLY CONTROLLING BRAKING AND WHEEL SPEED AT A DOLLY

(71) Applicant: Bendix Commercial Vehicle Systems LLC, Avon, OH (US)

(72) Inventors: Daniel Zula, North Ridgeville, OH (US); Michael Cremona, Lakewood, OH (US); Thomas Hayes, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 218 days.

(21) Appl. No.: 18/072,167

(22) Filed: Nov. 30, 2022

(65) Prior Publication Data
US 2024/0174204 A1    May 30, 2024

(51) Int. Cl.
| | | |
|---|---|---|
| *B60T 8/17* | (2006.01) | |
| *B60Q 9/00* | (2006.01) | |
| *B60T 7/20* | (2006.01) | |

(52) U.S. Cl.
CPC .............. *B60T 8/1708* (2013.01); *B60Q 9/00* (2013.01); *B60T 7/20* (2013.01); *B60T 2250/00* (2013.01)

(58) Field of Classification Search
CPC .................................. B60T 8/1708; B60T 7/20
See application file for complete search history.

(56) References Cited

U.S. PATENT DOCUMENTS

| | | | | |
|---|---|---|---|---|
| 9,457,970 | B1* | 10/2016 | Zevenbergen | B25J 9/0093 |
| 9,708,000 | B2* | 7/2017 | Hafner | B62D 15/0275 |
| 2016/0059888 | A1* | 3/2016 | Bradley | B62D 13/06 701/41 |
| 2016/0101811 | A1* | 4/2016 | Kyrtsos | B62D 15/0285 701/25 |
| 2016/0362135 | A1* | 12/2016 | Xu | B62D 13/06 |
| 2017/0217372 | A1* | 8/2017 | Lu | B60R 16/027 |
| 2018/0345952 | A1* | 12/2018 | Layfield | B62D 1/16 |
| 2019/0061816 | A1* | 2/2019 | Stabel | B62D 6/003 |
| 2019/0335100 | A1* | 10/2019 | Chen | G06V 20/56 |
| 2020/0324763 | A1* | 10/2020 | Switkes | G08G 1/161 |
| 2022/0017161 | A1* | 1/2022 | Layfield | B60K 7/0007 |
| 2022/0250681 | A1* | 8/2022 | Lavoie | B60W 10/20 |
| 2022/0355860 | A1* | 11/2022 | Rydström | B62D 13/06 |

* cited by examiner

*Primary Examiner* — Long T Tran
(74) *Attorney, Agent, or Firm* — Crowell & Moring LLP

(57) ABSTRACT

The present disclosure provides systems and methods for automatically controlling braking and/or wheel speed at a dolly to increase maneuverability. In one form, a system comprises a memory, a first sensor, and at least one processor. The first sensor is configured to determine at least one of a distance from a dolly to a forward trailer or an angle from the dolly to the forward trailer. The at least one processor is configured to: determine that a forward trailer is moving in a reverse direction; determine a steering angle of a vehicle coupled to the forward trailer; measure a rotation of the forward trailer based on information received from the first sensor; and apply at least one of braking or wheel speed control to at least one wheel of the dolly based on the measured rotation of the forward trailer and the determined steering angle of the forward trailer.

20 Claims, 3 Drawing Sheets

SYSTEMS AND METHOD FOR AUTOMATICALLY CONTROLLING BRAKING AND WHEEL SPEED AT A DOLLY

BACKGROUND

In North America, for truckload freight shipping (LTL), commercial fleets typically use A-train vehicle configurations for moving freight between terminals. An A-train vehicle configuration utilizes a dolly that is coupled with a pintle hook on a rear of a forward trailer, as illustrated in FIG. 1A. Of possible road train configurations, A-train dollies offer the most flexibility in extending trailer service from over-the-road to city driving. However, of the possible road train configurations, A-doubles and A-triples are the least maneuverable when reversing due to the extra degree of freedom associated with a pintle hook connection. Once an A-double or A-triple road train arrives at a terminal, the vehicle configuration is typically broken down manually by a driver or other terminal operators before the trailers can be docked.

Of possible road train configurations, B-doubles and B-triples are the most maneuverable, and many drivers can predictably reverse B-double and B-triple sets into dock positions without spending time to dismantle and maneuver the trailers. A B-train vehicle utilizes a combination where the axles of a lead trailer extend beyond the lead trailer so that a fifth wheel may be mounted on the lead trailer, as illustrated in FIG. 1B.

It would be desirable to modify the operation of A-train vehicles to have greater maneuverability similar to the maneuverability of B-train vehicles.

SUMMARY

The present disclosure addresses the above-describe problem and provides systems and methods for automatically controlling braking and/or wheel speed at a dolly to increase maneuverability.

In one aspect, a system is disclosed that comprises a memory, a first sensor, and at least one processor. The first sensor is configured to determine at least one of a distance from a dolly to a forward trailer or an angle from the dolly to the forward trailer.

The at least one processor is in communication with the memory and the sensor. Further, the at least one processor is configured to execute instructions stored in the memory and to: determine that a forward trailer is moving in a reverse direction; determine a steering angle of a vehicle coupled to the forward trailer based on information received from the vehicle coupled to the forward trailer; measure a rotation of the forward trailer based on information received from the first sensor; and apply at least one of braking or wheel speed control to at least one wheel of the dolly connected to the forward trailer based on the measured rotation of the forward trailer and the determined steering angle of the forward trailer.

In another aspect, a method is disclosed where at least one processor, positioned on a dolly that is connected to a forward trailer, determines that the forward trailer is moving in a reverse direction. The at least one processor determines a steering angle of a vehicle coupled with the forward trailer based on information received from the vehicle coupled to the forward trailer; measures a rotation of the forward trailer based on information received from a first sensor positioned on the dolly, where the first sensor is configured to determine at least one of a distance from the dolly to the forward trailer or an angle from the dolly to the forward trailer; and applies at least one of braking or wheel speed control to at least one wheel of the dolly based on the measured rotation of the forward trailer and the determined steering angle of the forward trailer.

In yet another aspect, an additional system is disclosed that is positioned on a dolly that is connected to a forward trailer. The system comprises a memory, a first sensor, a second sensor, and at least one processor.

The first and second sensors are positioned on opposite sides of the dolly, where the first sensor and the second sensor are configured to determine at least one of a distance from the dolly to a forward trailer or an angle from the dolly to the forward trailer.

The at least one processor is in communication with the memory and the first and second sensors. Further, the at least one processor is configured to execute instructions stored in the memory and to determine whether a forward trailer is moving in a reverse direction or a forward direction.

In response to a determination that the forward trailer is moving in a reverse direction, the at least one processor is configured to determine a steering angle of a vehicle coupled with the forward trailer based on information received from a vehicle coupled to the forward trailer; measure a rotation of the forward trailer based on information received from the first and second sensors; and apply at least one of braking or wheel speed control to at least one wheel of the dolly based on the measured rotation of the forward trailer and the determined steering angle of the forward trailer In response to a determination that the forward trailer is moving in a forward direction, the at least one processor is configured to determine whether at least one of the dolly or the forward trailer coupled with the dolly is experiencing lateral movements that exceed a threshold. When the dolly or the forward trailer is experiencing lateral movements that exceed the threshold, the at least one processor is configured to determine the steering angle of the vehicle coupled with the forward trailer based on information received from the vehicle coupled to the forward trailer.

When the steering angle of the forward trailer is determined to be zero, the at least one processor is configured to apply at least one of braking or wheel speed control to the at least one wheel of the dolly or the forward trailer based on the lateral movements at the dolly to address the lateral movements. When the steering angle of the forward trailer is determined to be other than zero, the at least one processor is configured to refrain from applying at least one of braking or wheel speed control to the at least one wheel of the dolly or the forward trailer based on the lateral movements.

DETAILED DESCRIPTION

The present disclosure is directed to systems and methods for automatically controlling braking and/or wheel speed at a dolly to increase maneuverability. In particular, the described system and methods provide increased maneuverability to A-train vehicle configurations and allow A-train vehicle configuration to maneuver similar to B-train vehicle configurations in a reverse direction.

Figure 2:
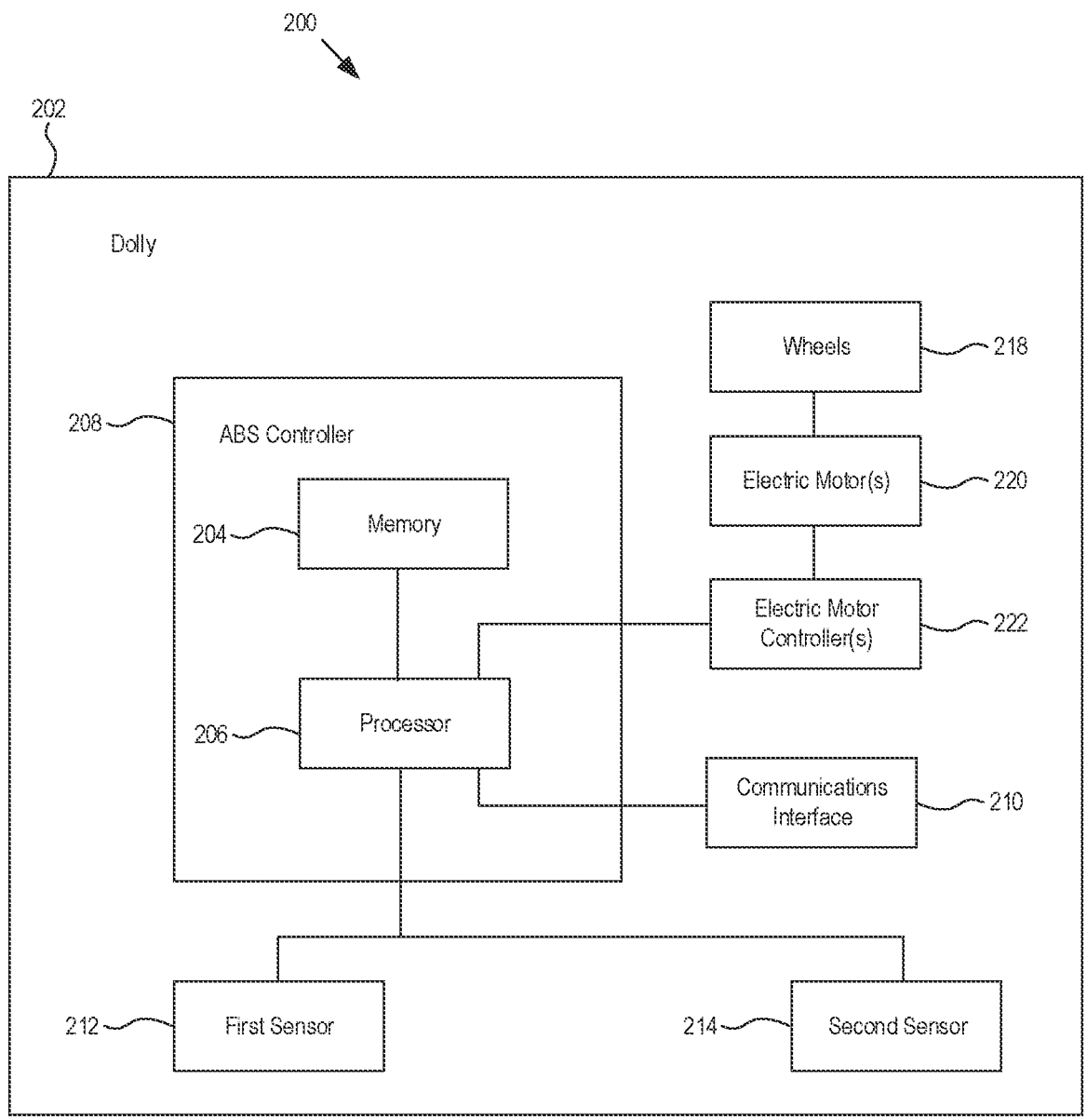
FIG. 2 is a block diagram of one form of a system that automatically controls braking and/or wheel speed at a dolly to increase maneuverability.

FIG. 2 is a block diagram of one form of a system 200 that automatically controls braking and/or wheel speed at a dolly to increase maneuverability. In some implementations, the system 200 is positioned on a dolly 202 that is utilized in A-train vehicle configurations where the dolly is coupled with a pintle hook on a rear portion of a forward trailer. However, in other implementations, the described system 200 may be utilized with other vehicles and/or trailer configurations.

The system includes memory 204 and one or more processors 206 in communication with the memory and configured to execute instructions stored in the memory 204. The processor may be a controller, a central processing unit, or any other type of electronic circuitry able to execute instructions stored in the memory 204.

In some implementations, the memory 204 and/or the one or more processors 206 may be part of an anti-lock braking system (ABS) controller 208 of the dolly 202. However, in other implementations, the memory 204 and/or the one or more processors 206 may be in communication with the ABS controller 208, but distinct from the ABS controller 208. By communicating with the ABS controller 208, the one or more processors 206 is able to separately control braking and or wheel speed on each side of the dolly 202, as well as determine a level of level of lateral movements of the dolly based on measurements by the ABS controller 208.

The system 200 further includes a communication interface 210 that allows the one or more processors 206 to communicate with a vehicle such as a tractor, other trailers, and/or other dollies within the tractor-trailer configuration. In some implementations the communication interface 210 provides for wired communications over powerline carriers or ethernet cable between the system 200 and the vehicle such as a tractor, other trailers, and/or other dollies within the vehicle trailer configuration. However, in other implementations, all or part of the communications may be wireless, such as cellular, WiFi, or Bluetooth.

The system additionally includes a first sensor 212 and a second sensor 214 that are in communication with the at least one processor 206. While the described system includes the first and sensors 212, 214, it will be appreciated that other implementations of the system may include one sensor or more than two sensors.

In some implementations, the first sensor 212 and the second sensor 214 are positioned on opposite sides of the dolly 202. Each of the first sensor 212 and the second sensor 214 are configured to measure at least one of a distance from the sensor to the forward trailer or an angle from the sensor to the forward trailer.

In some implementations, the first and second sensors 212, 214 may be an ultrasonic sensor, a camera, a radar sensor, or a light detection and ranging (LIDAR) sensor. However, in other implementations, other types of sensors may be used that are able to measure at least one of a distance from the sensor to the forward trailer or an angle from the sensor to the forward trailer.

In some implementation, the dolly 202 may include one or more wheels 218 that are driven by one or more electric motors 220. In these implementations, the one or more processors 206 are in communication with one or more controllers 222 of the one or more electric motors 220 to intelligently control wheel speed and/or direction of the wheels 218 driven by the electric motors 220.

Figure 3:
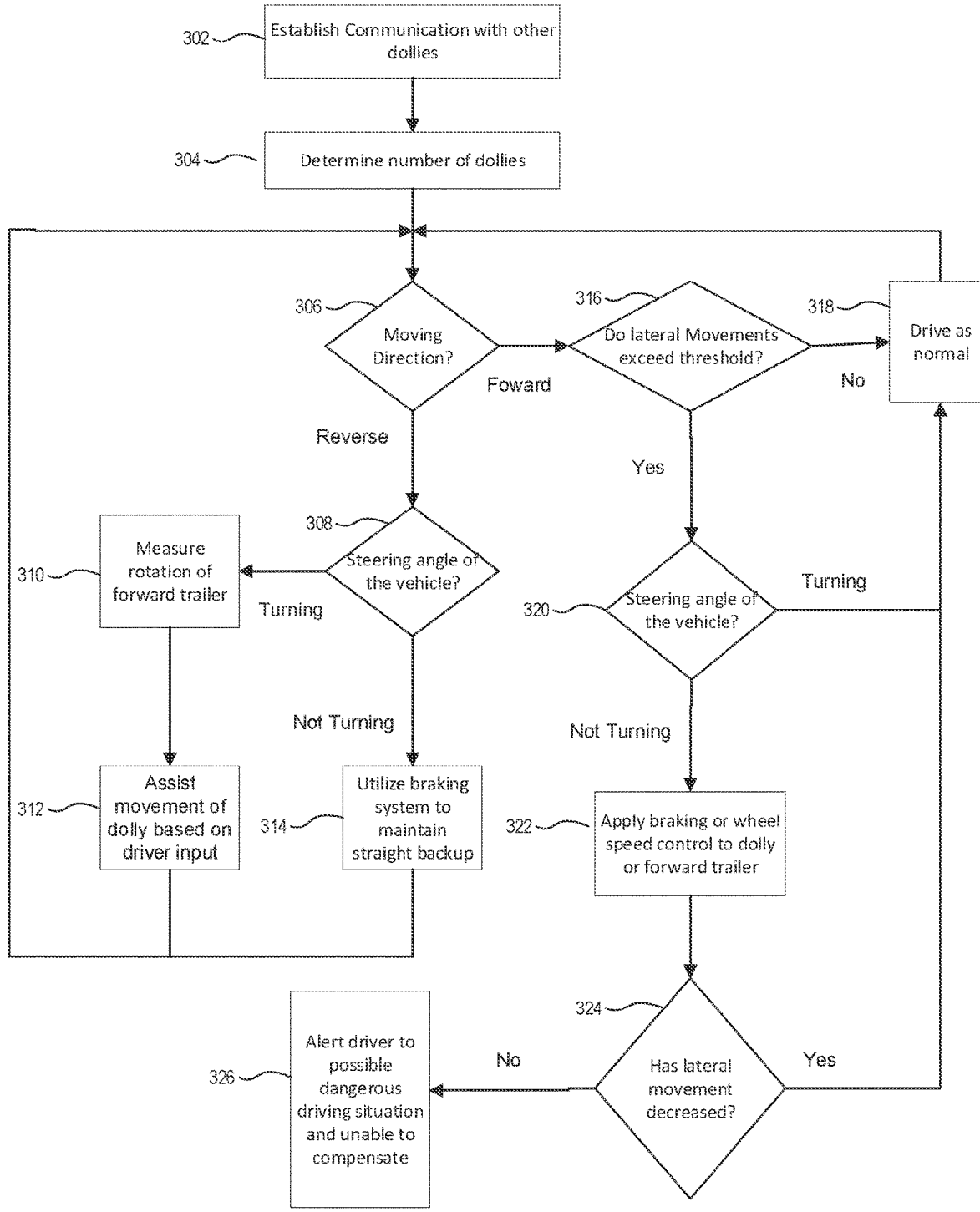
FIG. 3 is a flow chart of one form of a method for automatically controlling braking and/or wheel speed at a dolly to increase maneuverability.

FIG. 3 is a flow chart of one form of a method for automatically controlling braking and/or wheel speed at a dolly to increase maneuverability. In some implementations, the following method may be performed with a system such as the system described above in conjunction with FIG. 2. In some implementations, all or part of the system is positioned on a dolly that is part of a A-train vehicle configuration in which the dolly is coupled with a forward trailer, which is coupled to a vehicle such as a tractor.

At step 302, one or more processors of a system positioned on a dolly establish communication with any other dollies in the A-train vehicle configuration. In some implementations, at step 302, the one or more processors of the system additionally establish communication with other parts of the A-train vehicle configuration such as the vehicle and/or the forward trailer. As discussed above, the one or more processors may establish communication with other dollies, the vehicle, and/or the forward trailer over a wired communication or over a wireless communication.

At step 304, once communication is established, the one or more processors determine a number of dollies within the A-train vehicle configuration and whether each of the dollies within the A-train vehicle configuration are A-Type dollies. In some implementations, the one or more processors may utilize the number of dollies within the A-train vehicle configuration to adjust braking and/or wheel spin controls. For example, the processor may adjust timing parameters due to an increased amount of time that it may take to correct multiple trailers within an A-train vehicle configuration or the processor may adjust torque controls needed to correct multiple trailers due to an increased weight of multiple trailers within an A-train configuration.

At step 306, the one or more processors determine whether the vehicle is moving in a reverse direction or a forward direction. In some implementations, the one or more processors determine whether the vehicle is moving in a reverse direction or a forward direction through communications with an ABS controller of the dolly. However, in other implementations, the one or more processors may determine whether the vehicle is moving in a reverse direction or a forward direction through communications with vehicle regarding a transmission state, for example. Further, in implementations utilizing wheels driven by electric motors at the dolly, the one or more processors may determine whether the vehicle is moving in a reverse direction or a forward direction by communicating with the controllers of the electric motors at the dolly.

When the one or more processors determine at step 306 that the vehicle is moving in a reverse direction, at step 308, the one or more processors determine a steering angle of the vehicle coupled with the forward trailer. In some implementations, the one or more processors determine the steering angle of the vehicle coupled with the forward trailer based on information received from the vehicle coupled with the forward trailer.

When the one or more processors determine at step 308 that the steering angle of the vehicle is not zero, meaning that the vehicle is turning, at step 310 the one or more processors measures a rotation of the forward trailer based on information received from one or more sensors positioned on the dolly. As discussed above in conjunction with FIG. 2, the sensors 212, 214 on the dolly are configured to measure at least one of a distance from the sensor to the forward trailer coupled with the dolly or an angle from the sensor to the forward trailer coupled with the dolly.

At step 312, the one or more processors utilize dolly or trailer controls to assist movements of the dolly to correlate with driver inputs. In some implementations, the one or more processors may communicate with an ABS controller of the dolly to apply at least one of braking or wheel speed control to at least one wheel of the dolly connected to the forward trailer based on the measured rotation of the forward trailer and the determined steering angle of the forward trailer. Similarly, in implementations utilizing electric motors to drive wheels of the dolly, the one or more processor may communicate with a controller of the electric motors to apply at least one of braking or wheel speed control to at least one wheel of the dolly connected to the forward trailer based on the measured rotation of the forward trailer and the determined steering angle of the forward trailer.

In one example, the one or more processors may direct the ABS controller to apply at least one of braking or wheel speed control to oppose the measured rotation of the forward trailer to restrict a degree of freedom of the dolly and cause the A-train dolly to act more like a B-train dolly.

After step 312, the method loops to step 308, where the one or more processors again determine a steering angle of the vehicle coupled with the forward trailer as discussed above.

When the one or more processors determine at step 308 that the steering angle of the vehicle is zero, meaning that the vehicle is not turning, at step 314 the one or more processors utilize dolly or trailer controls to maintain a straight backup. In some implementations, the one or more processors may communicate with the ABS controller of the dolly to apply at least one of braking or wheel speed control to at least one wheel of the dolly connected to the forward trailer to maintain a straight backup. Similarly, in implementations where the dolly includes wheels driven by electric motors, the one or more processors may communication with controllers of the electric motors to apply at least one of braking or wheel speed control to at least one wheel of the dolly connected to the forward trailer to maintain a straight backup.

After step 314, the method loops to step 308, where the one or more processors again determine a steering angle of the vehicle coupled with the forward trailer as discussed above.

Referring again to step 306, when the one or more processors determine that the vehicle is moving in a forward direction rather than a reverse direction, at step 316, the one or more processors determine whether at least one of the dolly or the forward trailer coupled with the dolly is experiencing lateral movements that exceed a threshold. Excessive lateral movements of a vehicle are sometime known as hunting oscillations.

In some implementations, the one or more processors determine an amount of lateral movements at the dolly based on information from an ABS system of the dolly, where the ABS controller receives information from sensors of the ABS system at brakes of the dolly that detect lateral movements. Similarly, the one or more processors may receive similar information from the forward trailer coupled with the dolly through wired or wireless communication.

In one illustrative example, for a 53 foot trailer loaded at least 80%, the threshold may be set at 2.5 m/s/s. In another illustrative example, for a 53 foot trailer that is not loaded or has less than 20% of a maximum gross legal load, the threshold may be set at 4.0 m/s/s. It will be appreciated by those of skill in the art that the threshold may be adjusted based on factors such as a type of trailer or an amount of load within the trailer.

When the one or more processors determine at step 316 that lateral movements of one of the dolly or the forward trailer coupled with the dolly is not experiencing lateral movements that exceed the threshold, at step 318, the one or more processors refrain from applying at least one of braking or wheel control to one or more wheels of the dolly or the forward trailer, and operation continues normally.

Alternatively, when the one or more processors determine at step 316 that lateral movements of at least one of the dolly or the forward trailer coupled with the dolly is experiencing lateral movements that exceed the threshold, at step 320, the one or more processors determine the steering angle of the vehicle coupled with the forward trailer based on information received from the vehicle coupled with the forward trailer.

When the one or more processors determine at step 320 that the steering angle of the vehicle is not zero, meaning that the vehicle is turning, at step 318, the one or more processors refrain from applying at least one of braking or wheel control to one or more wheels of the dolly or the forward trailer, and operation continues normally.

Alternatively, when the one or more processors determine at step 320 that the steering angle of the vehicle is zero, meaning that the vehicle is not turning, at step 322 the one or more processors apply at least one of braking or wheel speed control to at least one wheel of the dolly or the forward trailer to attenuate the excessive lateral movement of the dolly or the forward trailer.

For example, the one or more processors may instruct an ABS controller or a controller of an electric motor driving a wheel to apply positive and/or negative torque to at least one wheel of the dolly to oppose a force at the dolly that is causing it to shift out of a desired angle and better control the lateral movements at the dolly.

At step 324, the one or more processors determine whether lateral movement has decreased in the dolly or forward trailer that previously experienced excessive lateral movement. When the one or more processors determine that the lateral movement has decreased with the system assistance, at step 318, the one or more processors refrain from further applying at least one of braking or wheel control to one or more wheels of the dolly or the forward trailer, and operation continues normally.

Alternatively, when the one or more processors determine that the lateral movement has not decreased with the system assistance, at step 326, the one or more processors alert a driver of the vehicle, or an autonomous vehicle system or robot driver operating the vehicle, to a possible dangerous driving situation that the system is unable to compensate form. In some implementations, the one or more processors may alert the driver by communicating to the vehicle such as a tractor in the A-train vehicle configuration to display the warning to the driver on a display of the vehicle or on a phone or tabled of the driver that is in communication with the vehicle that lateral movement has not decreased and action may be needed to slow down, move to a side of the road, and/or change an objection and/or mission associated with a trip. In implementations utilizing autonomous vehicle systems or robot drivers, the one or more processor may transmit the message over controller area networks, for example.

Figure 1A:
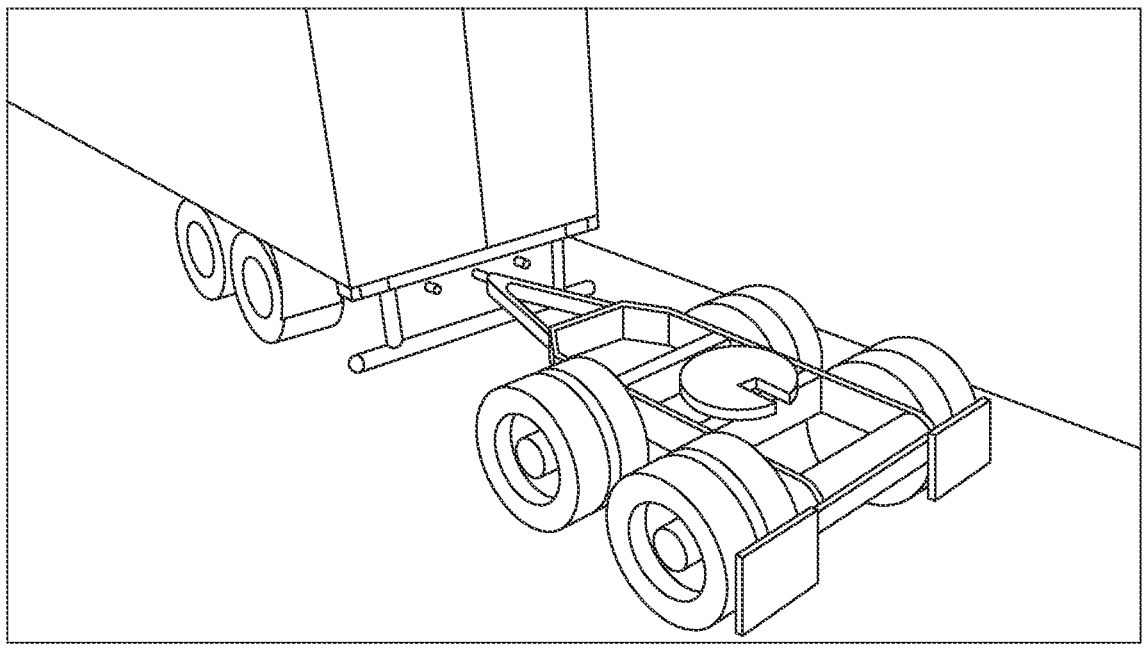
FIG. 1A and FIG. 1B illustrate different types of vehicle configurations.
Figure 1B:
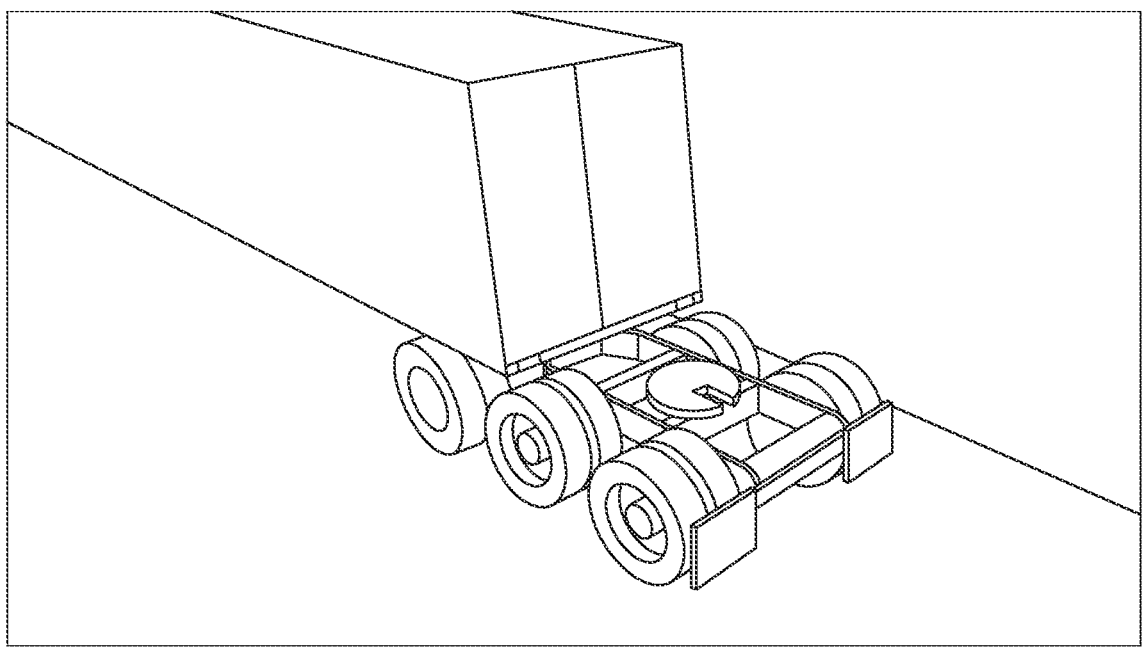

FIGS. 1-3 and their accompanying description teach systems and methods for automatically controlling braking and/or wheel speed at a dolly to increase maneuverability. It will be appreciated that the described systems and methods may be utilized with driver assistance systems where a driver operates a vehicle coupled with a trailer and a dolly in an A-train vehicle configuration, as well as with autonomous vehicles that are part of an A-train vehicle configuration that are not dependent on human interaction.

The foregoing disclosure has been set forth to illustrate the invention and is not intended to be limiting. Since modifications of the disclosed form and implementations incorporating the spirit and substance of the invention may occur to persons skilled in the art, the invention should be construed to include everything within the scope of the appended claims and equivalents thereof.

The invention claimed is:

1. A system comprising:
   a memory;
   a first sensor configured to determine at least one of a distance from a dolly to a forward trailer or an angle from the dolly to the forward trailer;
   at least one processor in communication with the memory and the sensor, where the at least one processor is configured to execute instructions stored in the memory and to:
      determine that a forward trailer is moving in a reverse direction;
      determine a steering angle of a vehicle coupled to the forward trailer based on information received from the vehicle coupled to the forward trailer;
      measure a rotation of the forward trailer based on information received from the first sensor; and
      apply at least one of braking or wheel speed control to at least one wheel of the dolly connected to the forward trailer based on the measured rotation of the forward trailer and the determined steering angle of the vehicle coupled to the forward trailer.

2. The system of claim 1, wherein the system is positioned on the dolly.

3. The system of claim 2, wherein the dolly is an A-Type dolly.

4. The system of claim 2, wherein:
   the system further comprises a second sensor positioned on the dolly that is configured to determine at least one of a distance from the dolly to the forward trailer or an angle from the dolly to the forward trailer;
   the first and second sensors are positioned on opposite sides of the dolly; and
   the measured rotation of the forward trailer is based on information received from both the first and second sensors.

5. The system of claim 1, wherein:
   the steering angle of the vehicle coupled to the forward trailer is determined to be a straight backup; and
   to apply at least one of braking or wheel speed control to at least one wheel of the dolly, the processor is configured the apply the at least one of braking or wheel speed control to the at least one wheel of the dolly to maintain straight backup.

6. The system of claim 1, wherein the at least one processor is further configured to:
   establish communication with at least one other dolly;
   determine a number of other dollies in communication with the dolly; and
   determine whether each of the at least one other dolly is an A-Type dolly.

7. The system of claim 6, wherein the dolly establishes communication with the at least one other dolly over wireless communications.

8. The system of claim 1, wherein the vehicle coupled with the forward trailer is an autonomous vehicle.

9. The system of claim 1, wherein the first sensor is an ultrasonic sensor.

10. The system of claim 1, wherein the first sensor is a camera.

11. A method comprising:
    determining, with at least one processor positioned on a dolly that is connected to a forward trailer, that the forward trailer is moving in a reverse direction;
    determining, with the at least one processor, a steering angle of a vehicle coupled with the forward trailer based on information received from the vehicle coupled to the forward trailer;
    measuring, with the at least one processor, a rotation of the forward trailer based on information received from a first sensor positioned on the dolly, where the first sensor is configured to determine at least one of a distance from the dolly to the forward trailer or an angle from the dolly to the forward trailer; and
    applying, with the at least one processor, at least one of braking or wheel speed control to at least one wheel of the dolly based on the measured rotation of the forward trailer and the determined steering angle of the vehicle coupled to the forward trailer.

12. The method of claim 11, wherein:
    a second sensor is positioned on the dolly, where the second sensor is configured to determine at least one of a distance to the forward trailer or an angle to the forward trailer;
    the first and second sensors are positions on opposite sides of the dolly; and
    measuring the rotation of the forward trailer comprises:
       measuring, with the at least one processor, the rotation of the forward trailer based on information received from the first sensor and the second sensor.

13. The method of claim 12, wherein:
    the steering angle of the vehicle coupled with the forward trailer is determined to be a straight backup; and
    applying at least one of braking or wheel speed control to at least one wheel of the dolly comprises:
       applying, with the at least one processor, at least one of braking or wheel speed control to at least one wheel of the dolly to maintain straight backup.

14. The method of claim 11, wherein the first sensor is an ultrasonic sensor.

15. The method of claim 11, wherein the first sensor is a camera.

16. The method of claim 11, wherein the vehicle coupled with the forward trailer is an autonomous vehicle.

17. A system positioned on a dolly that is connected to a forward trailer, comprising:
    a memory;
    a first sensor and a second sensor positioned on opposite sides of the dolly, where the first sensor and the second sensor are configured to determine at least one of a distance from the dolly to a forward trailer or an angle from the dolly to the forward trailer;
    at least one processor in communication with the memory and the first and second sensors, where the at least one processor is configured to execute instructions stored in the memory and to:
       determine whether a forward trailer is moving in a reverse direction or a forward direction;
       in response to a determination that the forward trailer is moving in a reverse direction:
          determine a steering angle of a vehicle coupled with the forward trailer based on information received from a vehicle coupled to the forward trailer;

measure a rotation of the forward trailer based on information received from the first and second sensors; and apply at least one of braking or wheel speed control to at least one wheel of the dolly based on the measured rotation of the forward trailer and the determined steering angle of the vehicle coupled with the forward trailer; and in response to a determination that the forward trailer is moving in a forward direction:

determine whether at least one of the forward trailer or the dolly is experiencing lateral movements that exceed a threshold;

when the dolly is experiencing lateral movements that exceed the threshold:

determine the steering angle of the vehicle coupled with the forward trailer based on information received from the vehicle coupled to the forward trailer;

when the steering angle of the vehicle coupled with the forward trailer is determined to be zero, apply at least one of braking or wheel speed control to the at least one wheel of the dolly or the forward trailer based on the lateral movements at the dolly to address the lateral movements; and when the steering angle of the vehicle coupled with the forward trailer is determined to be other than zero, refrain from applying at least one of braking or wheel speed control to the at least one wheel of the dolly or the forward trailer based on the lateral movements.

18. The system of claim 17, wherein when the dolly is experiencing lateral movements that exceed the threshold and the steering angle of the forward trailer is determined to be zero, in response to a determination that the lateral movements at the second trailer have not decreased after application of the at least one of braking for wheel speed control to address the lateral movements, the at least one processor is further configured to alert a driver to the lateral movements.

19. The system of claim 17, wherein the first and second sensors are ultrasonic sensors.

20. The system of claim 17, wherein the vehicle coupled with the forward trailer is an autonomous vehicle.

* * * * *